J. BUCHLI.
SHAFT COUPLING.
APPLICATION FILED MAR. 5, 1919.
1,428,750.
Patented Sept. 12, 1922.
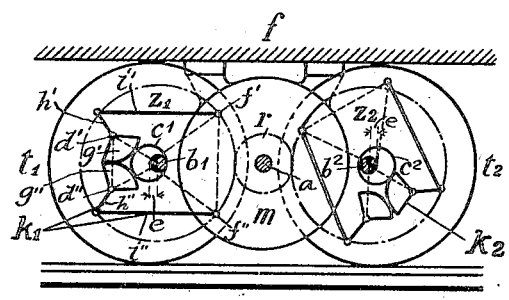
INVENTOR
J. Buchli.
BY H. R. Kerslake.
ATTORNEY Patented Sept. 12, 1922.

1,428,750

UNITED STATES PATENT OFFICE.

JACOB BUCHLI, OF BADEN, SWITZERLAND, ASSIGNOR TO AKTIENGESELLSCHAFT BROWN, BOVERI & CIE., OF BADEN, SWITZERLAND.

SHAFT COUPLING.

Application filed March 6, 1919. Serial No. 280,823.

*To all whom it may concern:*

Be it known that I, JACOB BUCHLI, a citizen of the Swiss Republic, residing at No. 18 Landliweg, Baden, Switzerland, have invented certain new and useful Improvements in Shaft Couplings, of which the following is a specification.

For the purpose of coupling two shafts having equal angular velocities, and having their axes of rotation out of line with each other in a varying degree owing to one shaft being resiliently mounted or sprung relatively to the other, in a vehicle, it has been proposed among other devices to employ a combination of rods, in which two cranks fixed on one shaft are connected by means of rods and bell crank levers to two cranks fixed on the other shaft. Such an arrangement must be unsymmetrical because in order to compensate the varying distances between the two pairs of crank pins connected to the two shafts, the arms of the two bell crank levers which are adapted to rotate about one pair of pins as axes must be directed toward the same side. The arrangement moreover comprises eight pivot pins.

In order to make the arrangement symmetrical my earlier Patent 1298881 proposes the employment of devices located in the middle of the coupling and the rods jointed to the two crank pins of one shaft are connected to two toothed segments which are adapted to rotate on the crank pins of the other shaft and engage with each other at the centre of the coupling.

It has also been proposed to locate couplings of the kind last described at each end of one shaft and to space apart angularly the planes of symmetry of the two couplings in order to minimize the vibrations due to the fluctuations in their respective angular velocities.

Instead of driving one shaft with one motor through a toothed wheel gearing, two adjacent shafts can be driven with one motor, the motor pinion meshing at the same time with two toothed wheels keyed on adjacent shafts. If each of these shafts or toothed wheels is coupled by means of a coupling of the type mentioned above with a relatively eccentric vehicle shaft, the fluctuations mentioned will again occur.

The object of the present invention is to displace the planes of symmetry of the couplings relatively to each other in such a manner that the vibrations due to variations in the angular velocity are reduced to a minimum in an arrangement in which two adjacent vehicle shafts are connected respectively, by a coupling of the type referred to above, to eccentrically located driving shafts which are jointly driven by a pinion of a single motor shaft.

An embodiment of this invention is illustrated in the accompanying drawing which shows the arrangement of transmission gear for effecting the object thereof.

The arrangement shown consists of a motor $m$ rigidly mounted in bearings attached to the underside of the vehicle framing $f$ which frame is supported by springs (not shown) mounted on the underside of the frame $f$ which springs rest upon bearings mounted in horn plates or guides in which the axles of the driving wheels are carried. The said wheels are driven by means of a central pinion $r$ on the motor shaft gearing with the toothed wheels $z_1$ $z_2$ which are mounted on shafts $b_1$, $b_2$ and which actuate through the medium of intermediate lever couplings $k_1$ $k_2$ the driving wheels $t_1$ $t_2$ which with their axles $c_1$ and $c_2$ are located eccentrically out of line with the shafts of the toothed wheels to a degree of eccentricity represented in this case by $e$. The couplings $k_1$, $k_2$ are constructed as follows:

On each toothed wheel $z_1$—$z_2$ respectively two pins $d'$, $d''$ are fixed, while on each driving wheel $t_1$ and $t_2$ there are fitted two pins $f_1$, $f_2$. About the pins $d'$, $d''$ rotate the meshing toothed segments $g'$, $g''$ which are provided with extensions $h'$, $h''$ beyond their centres of rotation, $d'$, $d''$. The ends of these extensions are flexibly connected to the pins $f'$, $f''$ by rods $i'$, $i''$.

In this arrangement it is preferred to interpose an elastic intermediate member between the drive and one of the two couplings, such as described and claimed in my prior patent.

Having now described my invention, what I claim as new and desire to secure by Letters Patent is:—

1. A device for coupling two driven shafts of a vehicle and a driving shaft resiliently mounted with respect to said driven shafts on said vehicle including two articulated couplings spaced apart angularly in relation to their respective planes of symmetry, and two members connected by said couplings to their respective shafts and coacting with a common member.

2. A device for coupling two driven shafts of a vehicle and a driving shaft resiliently mounted with respect to said driven shafts on said vehicle including two articulated couplings spaced apart angularly in relation to their respective planes of symmetry, and two toothed wheels connected by said couplings to their respective shafts and meshing with a common toothed wheel.

3. A device for coupling two driven shafts of a vehicle and a driving shaft resiliently mounted with respect to said driven shafts on said vehicle including two articulated couplings located both on the same side of the vehicle and spaced apart angularly in relation to their respective planes of symmetry, and two members connected by said couplings to their respective shafts and coacting with a common member.

4. A device for coupling two driven shafts of a vehicle and a driving shaft resiliently mounted with respect to said driven shafts on said vehicle including two articulated couplings located both on the same side of the vehicle and spaced apart angularly in relation to their respective planes of symmetry, and two toothed wheels connected by said couplings to their respective shafts and coacting with a common toothed wheel.

In testimony whereof I have signed my name to this specification.

JACOB BUCHLI.